UNITED STATES PATENT OFFICE.

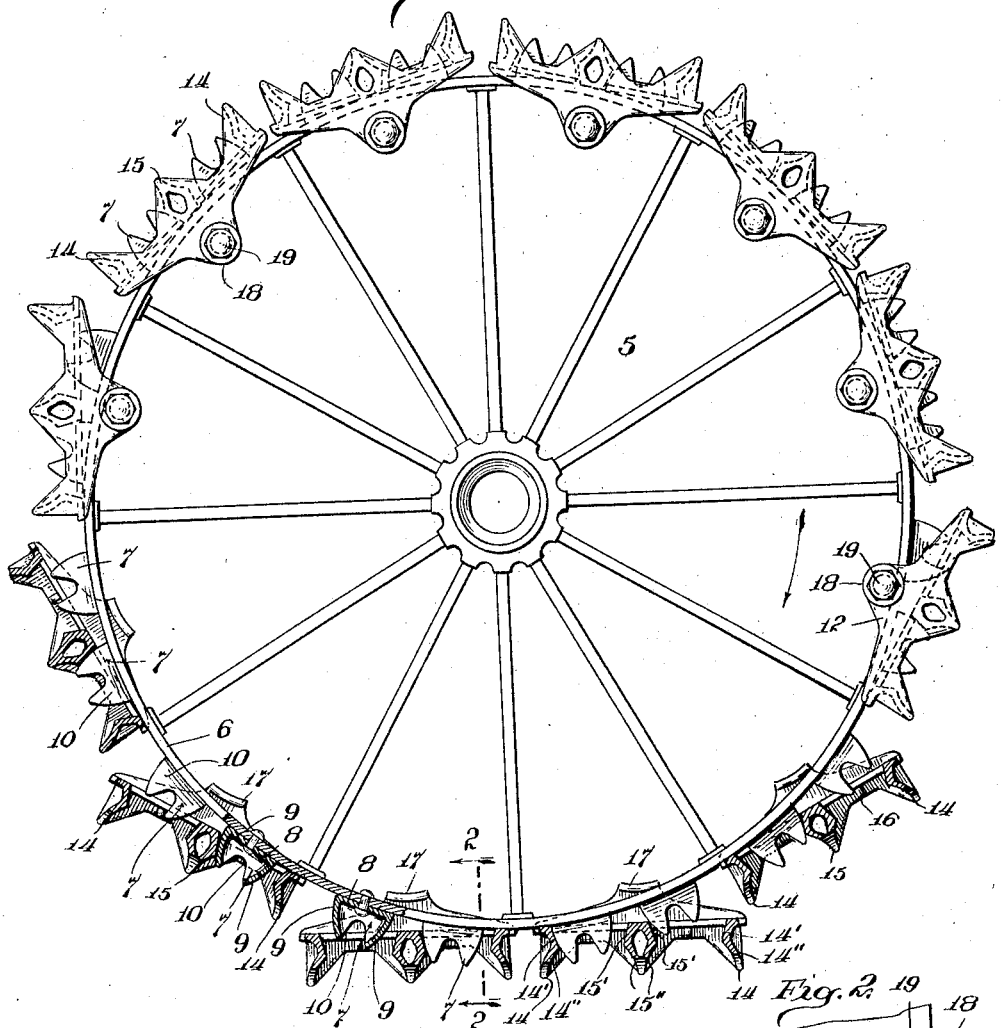
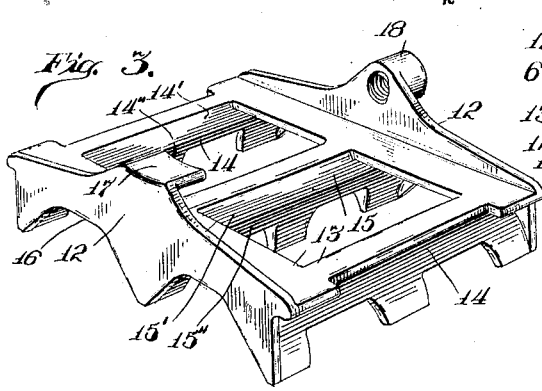
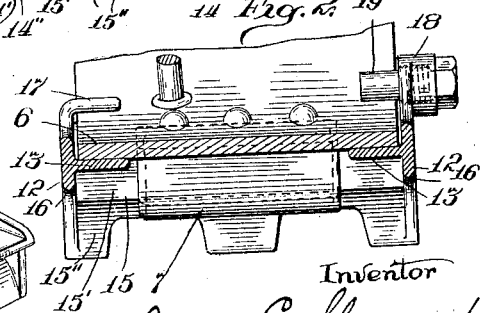

LOUIS E. SLAUSON, OF ROCK ISLAND, ILLINOIS, ASSIGNOR TO GRID-IRON-GRIP COMPANY, OF ROCK ISLAND, ILLINOIS.

TRACTION-WHEEL.

1,393,708.   Specification of Letters Patent.   Patented Oct. 11, 1921.

Application filed June 12, 1919. Serial No. 303,641.

*To all whom it may concern:*

Be it known that I, LOUIS E. SLAUSON, a citizen of the United States, residing at Rock Island, in the county of Rock Island and State of Illinois, have invented certain new and useful Improvements in Traction-Wheels, of which the following is a specification.

The object of this invention broadly is to convert an ordinary smooth rim wheel into a traction wheel by the application thereon in a novel manner of a plurality of traction shoes so constructed and so mounted on the rim of the wheel that as the wheel revolves they will automatically adjust themselves in proper position for forward or reverse travel to lay a smooth and practically unbroken track over which the rim of the wheel travels smoothly and evenly and without slippage.

More particularly the invention has for its object to provide a strong and substantial traction shoe of simple and compact form and construction which can be produced at low cost as a one-piece casting and easily applied to the rim of an ordinary tractor or other similar wheel and held in proper position thereon.

The accompanying drawings illustrate a preferred embodiment of the invention which I have found satisfactory in actual use, and referring thereto, Figure 1 is an elevation, partly in section, of a traction wheel embodying the invention in what I now consider a preferred form.

Fig. 2 is a transverse sectional view on line 2—2 of Fig. 1.

Fig. 3 is a perspective view of the shoe.

In the drawings 5 designates generally a metal wheel of any usual construction having a rim 6. My invention is adapted to be applied to old wheels as well as to new wheels and I contemplate that wheel manufacturers in the future will punch the rims of their wheels so that my invention may be applied to the rims by the tractor manufacturer or by the purchaser as and when desired. And while the invention may be readily removed from the wheel if no longer required I particularly direct attention to the fact that this not necessary for travel on hard pavements or road beds, as it is with some of the lug devices which are detachably applied to traction wheels, because the shoes will not dig into or otherwise injure a hard surface since they have no lateral movement on the surface.

A plurality of teeth 7 are bolted, riveted or otherwise securely fastened to the rim in pairs at spaced intervals. These teeth are shorter than the width of the rim and they are located centrally of the rim as shown in Fig. 2. In the form shown each tooth has a base 8, curved sides 9 and recessed ends 10, forming a hollow tooth having a substantially flat base to engage the rim and two longitudinal prongs formed by the curved sides. This tooth may be made of cast steel, chilled iron, or any other suitable material.

A traction shoe is loosely mounted on the face of the rim by means located at the back of the rim between the teeth of each pair. The shoes are all made alike, in grid or skeleton form, and each comprises parallel sides 12, inwardly directed longitudinally extending track flanges 13, end cross-bars 14, and a middle cross-bar 15. The sides are cut out at 16 between the cross-bars, and the flanges 13 extend inwardly closely adjacent to the ends of the teeth, Fig. 2. The end cross-bars may be of a single thickness, inclining toward each other at the top thereof at 14′, and from there on to their outer edges flaring in opposite directions at 14″. The middle cross-bar 15 is preferably made substantially wedge-shaped and hollow for lightness. It has oppositely inclined upper sides 15′ and inwardly curved lower sides 15″.

The sides 12 of the shoe extend above the flanges 13 sufficiently to inclose the side edges of the rim 6, and one side 12 is provided with an integral inward-projecting hook or lip 17 and the other side is provided with a lug 18 bored and threaded to receive a transverse bolt 19. The hook 17 and the bolt 19 are disposed opposite each other and are spaced from the flanges 13 sufficiently to loosely connect the shoe with the rim so that the shoe will have a considerable play or movement relative to the rim. In this form of my invention the hook or lip 17 is broad and curved slightly transversely, as shown in Fig. 1. The middle cross-bar 15 of the shoe is located between the teeth 7 of a pair and the parts are so proportioned that the shoe will have the desired amount of loose play relative to the rim with the middle cross-bar engaging the oppositely disposed sides of the pair of teeth and the end cross-bars engaging the outer sides of the teeth in the play of the shoe. Thus the shoe is freely movable within certain fixed limits on the rim and is induced to move by gravity and by the engagement of the teeth and cross-bars so that each shoe will be presented in a substantially horizontal position to the surface over which the wheel travels, and will be picked up in a substantially horizontal position from said surface after the radial center of the wheel has passed thereover.

In practice the teeth are disposed in pairs spaced equidistant around the rim and the shoes are then applied as shown in the drawings or in some equivalent manner. The parts are so proportioned that when the rim is completely equipped with teeth and shoes the ends of the shoes may approach each other in close juxtaposition, but without touching. Thus each shoe is at all times freely movable without interfering with or interference from either adjacent shoe. The wheel may be equipped with my invention at the factory and sold in its complete form, or the shoes and other parts may be sold separately in standard sizes for application to the wheel at any time. The simplicity of the invention makes it possible for anybody to apply the shoe and other parts to a wheel in the first instance and to remove and re-apply them as often as desired. It may be necessary to construct the parts of my invention in different sizes to fit wheels of different sizes but I believe that a comparatively few standard sizes will suffice.

The shoes travel with the rim of the wheel as the wheel revolves and move freely, by gravity and by reason of the engagement of the teeth with the cross-bars, to any position within their prescribed limits of movement, but they always maintain their position on the rim relative to each other and do not interfere or overlap at any time. Each shoe is engaged flatwise with the surface over which the wheel travels, that is to say, the shoe is presented horizontally to the surface so that by the time the rim travels thereon the shoe is at rest on the surface with all cross-bars thereof in engagement with the surface. Hence, if the cross-bars are forced into the surface by the weight carried by the wheel they will enter the surface evenly and make clean cuts without shifting the earth between these cuts. The flanges and the cross-bars provide an extended track surface for engagement with the rim so that the weight carried by the wheel is distributed over a considerable area which reduces the penetration of the cross-bars in the surface. I prefer to make the ground engaging edges of the cross-bars discontinuous by recessing them at 20 but they may be continuous if desired.

By reference to the drawings, it will be noted that before the wheel rim has rolled from one shoe another shoe will be properly positioned to receive it, and since the shoes are thus positioned in close juxtaposition and in alinement there is provided a sectional track which is carried by the rim and laid as the wheel travels and forming, to all intents and purposes, a continuous track for the rim. Each shoe is laid flat upon the ground before it receives the weight of the wheel and this is important because it prevents the shoe from digging in the ground at one end as would happen if the weight were applied to that end before the rest of the shoe was properly placed on the ground. Furthermore, this provides for distributing the weight over the entire area of the shoe, whereby one shoe will lie flush, or substantially flush, with the next and provide a track which may for various reasons incline like the grade of a street pavement but which will always be smooth and even and which will prevent the wheel from packing plowed ground.

The shape of the shoe and its transverse bars, and the teeth, and the coöperative relation of the teeth and shoes, all serve their part in keeping the shoes clean and free from dirt clods, especially when plowing in soft ground. This is, of course, desirable to maintain the shoes at their highest efficiency. The ground engaging portions of the transverse bars of the shoe are tapered, in effect, so that they will make a narrow clean cut in the ground and withdraw therefrom without dragging dirt with them. It has been found in actual use that the shoes will keep clean,—that is to say, free from clods or accumulation of dirt which would interfere with their proper operation,—under all ordinary conditions, and this is due, as before indicated, very largely to the shape of the bars which are, in effect, self-cleaning. There will be a tendency, of course, in wet or very soft ground, for the dirt to stick to the shoes in clods of more or less size, but due to the movable mounting of the shoes on the rim and the coöperative action of the shoes and teeth, while the shoes travel with the rim, during which travel it will be noted that the shoes shift endwise on the rim, there is no liability of the shoes ever becoming clogged with dirt to such an extent that they will not be properly presented to the ground under any ordinary conditions. This is a very important feature of my invention and particularly because of the simple manner in which the result is accomplished.

It has also been found in the practical use of the invention that it entirely eliminates slippage,—at least so far as can be observed with the eye. This is also important because it is a fact, although it may appear extraordinary, that in a day's plowing the loss of distance due to slippage will be considerable, in fact it may exceed ten per cent. This also involves a loss of fuel and time, besides the wear and tear on the machinery. Tractors equipped with this invention have been carefully watched on soft and on hard ground and on turf and no evidence of any material slippage has been observed. When it is understood that a tractor wheel with cleats or lugs will show slippage so plainly that critical examination is not necessary, and will shift the ground between cleats or spurs laterally in clods, the importance of my invention will be better appreciated.

I am aware that changes in the form and proportion and arrangement of parts of my invention may be made without departing from the spirit or sacrificing the advantages thereof and I therefore reserve the right to make all such changes as fairly fall within the scope of the following claims.

I claim:

1. A traction shoe for attachment to the rim of a wheel and having transverse ground engaging bars at the ends thereof, said bars having recessed outwardly flared outer edges.

2. A traction shoe for attachment to the rim of a wheel and having transverse ground engaging bars at its ends, said bars inclining inwardly at the upper portion and inclining outwardly at the outer portion thereof.

3. A traction shoe for attachment to the rim of a wheel and having a substantially wedge-shaped transverse ground engaging bar intermediate of its ends and outwardly flared transverse ground engaging bars at its ends.

4. A traction shoe for attachment to the rim of a wheel and having a plurality of transverse ground engaging bars comprising an intermediate bar having outwardly inclined upper sides and substantially wedge-shaped in cross section therebelow, and oppositely flared end bars.

5. A traction shoe for attachment to the rim of a wheel and having a plurality of transverse ground engaging bars, the upper portion of the end bars inclining toward each other and the lower portion of the end bars being outwardly flared, and the upper portion of the intermediate bar having oppositely inclined sides and the lower portion of said intermediate bar being substantially wedge-shaped in cross section.

6. A traction shoe for attachment to the rim of a wheel and having end and intermediate ground engaging cross-bars, the opposing faces of the outer portion of adjacent bars being recessed and oppositely directed.

7. A traction shoe for attachment to the rim of a wheel and having an opening in one side thereof to receive an attaching bolt and an integral hook on the other side thereof to engage the rim, said hook being of considerable width as compared with the bolt opening in the side of the shoe and being curved transversely on an arc of greater degree than that of said opening.

8. The combination with the rim of a wheel, of a traction shoe having an opening therein, ground engaging bars at the ends of the opening, and a tooth on the rim operating in said opening, the sides of the tooth and the upper portion of each bar being correspondingly inclined for coöperative engagement, the lower portion of each bar being outwardly inclined.

9. The combination with the rim of a wheel, of a traction shoe having an opening therein, ground engaging bars in said opening, the sides of the tooth and the upper portion of each bar being inwardly inclined for coöperative engagement, the lower portion of each bar being outwardly inclined.

10. The combination with the rim of a wheel, of a traction shoe having a pair of openings therein, ground engaging bars at the ends of and intermediate said openings, and a pair of teeth on the rim operating in said openings, the sides of said teeth and the upper portion of each bar being correspondingly inclined for coöperative engagement, the lower portion of the end bars being outwardly flared and the lower portion of the intermediate bar being wedge shaped.

11. The combination with the rim of a wheel, of a traction shoe having an opening therein, ground engaging bars at the ends of the openings, the lower portion of said bars being outwardly flared, and a tooth on the rim operating in said opening and engaging the bars above their flared portion.

12. The combination with the rim of a wheel, of a traction shoe having a pair of openings therein, ground engaging bars at the ends of the openings, said bars being oppositely flared at their lower portions and inwardly inclined at their upper portions, and teeth secured on the rim and operating in said openings and engaging said upper inclined portions.

LOUIS E. SLAUSON.

Witnesses:
J. K. BRANDENBURG,
HENRY J. BESELIN.